O. O. Storle,
Harvester Rake.

No. 85870.        Patented Jan. 12, 1869.

WITNESS.        INVENTOR.

Ole O. Storle

UNITED STATES PATENT OFFICE.

OLE O. STORLE, OF NORWAY, WISCONSIN.

IMPROVEMENT IN HARVESTER-RAKES.

Specification forming part of Letters Patent No. 85,870, dated January 12, 1869.

*To all whom it may concern:*

Be it known that I, OLE O. STORLE, of Norway, in the county of Racine and State of Wisconsin, have invented a new and useful Improvement in Harvester Reel and Rakes; and I do hereby declare that the following is a full, clear, and exact description thereof, which will enable those skilled in the art to make and use the same, reference being had to the accompanying drawings, forming part of this specification, in which—

Figure 1:
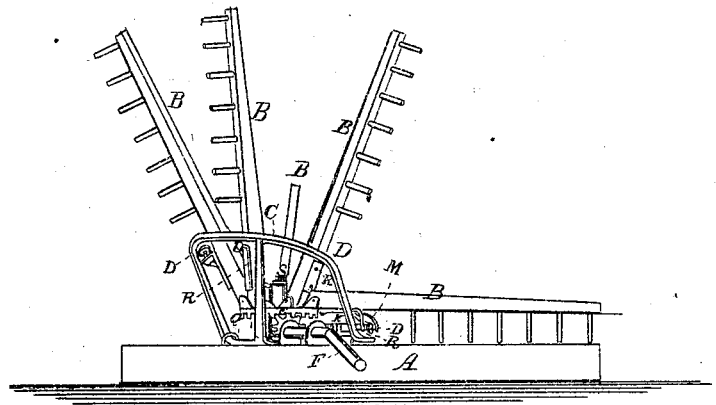
Figure 2:
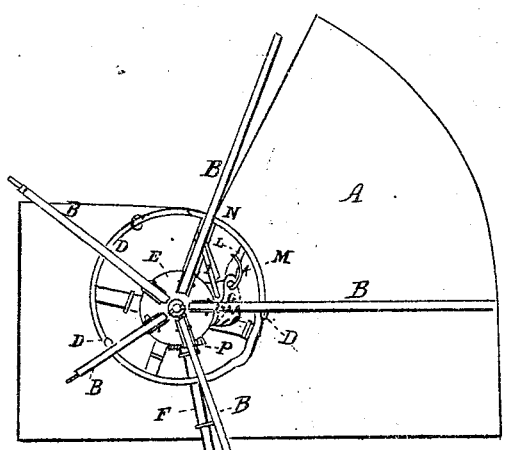
Figure 4:
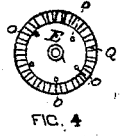
Figure 3:
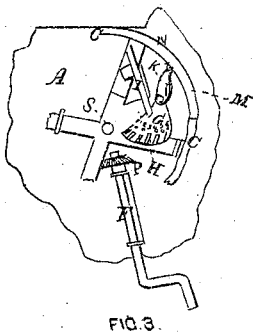

Figure 1 is a front view of my invention; Fig. 2, a top view; Fig. 3, a sectional view of the works which operate the rakes, with the rakes and operating-hub removed; and Fig. 4, the hub to which the rakes are attached reversed.

Similar letters of reference in each of the figures indicate corresponding parts.

The object of my invention is to produce a rake and reel for harvesters that shall rake automatically, so arranged as to be adjusted to rake faster or slower, according to the size of the gavels required.

A is the platform; B, the rakes; C, the railway on which the rakes traverse; D, rollers on the rakes, which ride round on the rail C, and which pass under the rail at M, when it is desired to rake the grain from the platform, or over the rail at M when not desired to rake; E, the hub, to which the ends of the rakes B are fastened, and which allows the rakes to be raised up endwise, and fall down in accordance with the rail-track C; F, shaft, with which motion is given the hub E; G, track or rail-shifter, fastened at its middle by a pin, which passes through it and the lever L, and on which it vibrates. The shifter has six cogs raised on its end which the pins O, in the bottom of hub E, pass through to regulate the passage of the rake B over or under the latch M, and six holes, numbered 1, 2, 3, 4, 5, 6, which a pin in lever L fits into to regulate the size of a bundle. If put in hole 5 one of the rakes will have its roller pass under M, and the rake will rake off the grain, while all the other rakes will pass over M. H, the pin in lever L, under rake-shifter G, to regulate the size of the bundle; I, a spring to hold the rake-shifter G down to its place; K, a tail to rake-shifter G, that the projection on the rake may turn it back again, so that the next pin in the hub E may take in the right cog; L, the lever which strikes the projection on the under side of the piece M, and raises M or the roller D on the rake to pass under; M, the latch or piece of rail hung by a hinge at one end, for the rake-roller D to pass under; N, the piece of the rail hung by a hinge at one end, so that the roller may come out and pass up over the rail and round again; O, pins on the under side of hub E, to operate the rake-shifter; P, pinion on shaft F; Q, cogs on the under side of hub E, for pinion P to mesh into; R, iron on the under side of the rakes, to which roller D is attached. This iron strikes lever K as the rake passes round, and adjusts the shifter G; S, pin on which hub E revolves.

Operation: Set the rake-shifter G whenever you wish to rake. If you wish every rake to rake, put the rake-shifter G so that hole 1 will be over the pivot H in lever L. If you wish every other rake to rake, then put hole 2 over the pin H, and so on, according to the number of rakes you wish to rake. These rakes bring the grain to the sickles to be cut, and rake it off the platform, as desired.

What I claim as my invention, and desire to secure by Letters Patent, is—

1. Rail-shifter G and lever L, operating substantially as described.

2. Hub E, with the pins O, in combination with pinion P and shifter G, substantially as described.

OLE O. STORLE.

Witnesses:
J. B. SMITH,
C. S. BIRGE.